INVENTOR.
JOSEPH A. LANCIAULT
BY
Victor J. Evans & Co.
ATTORNEYS.

United States Patent

[11] 3,595,216

| [72] | Inventor | Joseph A. Lanciault |
| | | 209 Highland Ave., Tucson, Ariz. 01420 |
| [21] | Appl. No. | 46,861 |
| [22] | Filed | June 17, 1970 |
| [45] | Patented | July 27, 1971 |

[54] MOBILE SOLAR WATER HEATER
4 Claims, 5 Drawing Figs.

[52] U.S. Cl. ................................................ 126/271
[51] Int. Cl. ................................................ F24j 3/02
[50] Field of Search ................................... 126/270, 271; 237/1 A

[56] References Cited
UNITED STATES PATENTS

| 1,765,136 | 6/1930 | Drane, Jr. ........................ | 126/271 |
| 1,989,999 | 2/1935 | Niederle ......................... | 126/271 |
| 2,064,345 | 12/1936 | Hodgson ....................... | 126/271 |
| 2,122,821 | 7/1938 | Mohr............................. | 126/271 |
| 2,920,710 | 1/1960 | Howard........................ | 126/270 X |
| 3,039,453 | 6/1962 | Andrassy...................... | 126/271 |

Primary Examiner—Charles J. Myhre
Attorney—Victor J. Evans & Co.

ABSTRACT: A mobile solar water heater mounted on the top of a camper and including a water tank and water heating coils positioned in a heater box exposed to solar energy. The heater box is adjustable about a vertical pivot so as to be directed at the sun throughout the day.

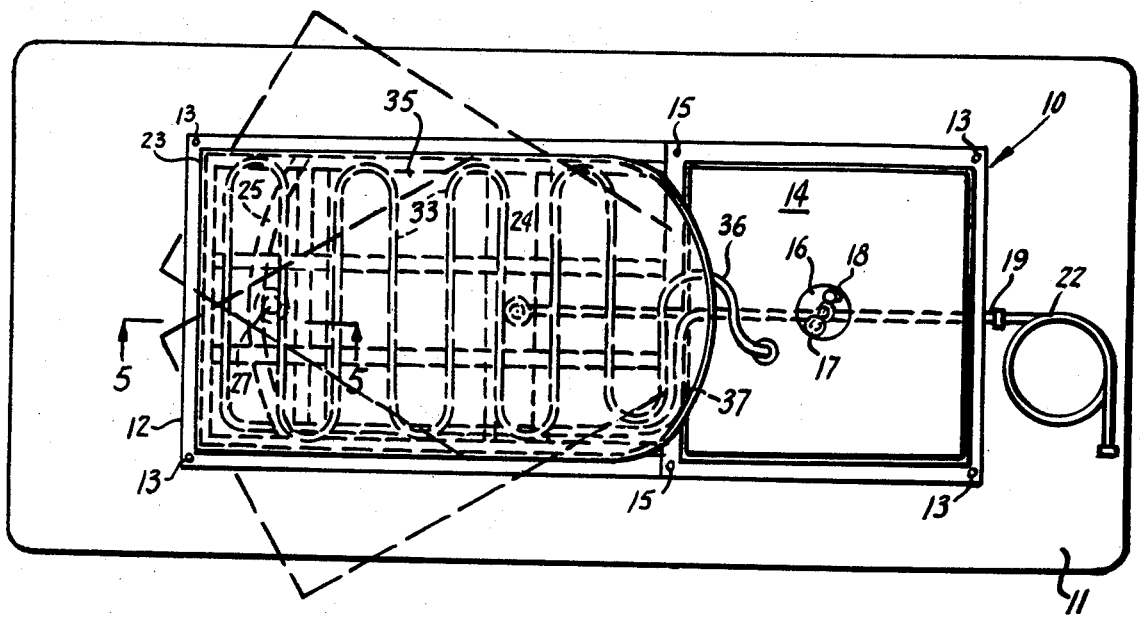

INVENTOR.
JOSEPH A. LANCIAULT
BY
Victor J. Evans & Co.
ATTORNEY.

MOBILE SOLAR WATER HEATER

BACKGROUND OF THE INVENTION

FIELD OF THE INVENTION

The present invention relates to the solar heating of water for camper trailers, mobile homes and the like.

SUMMARY OF THE INVENTION

The present invention includes a solar heat box having water pipe coils therein with the heat box being mounted on top of a trailer and being pivotable about a vertical pivot to direct the heat box toward the sun throughout the day. A tank is connected to the coil of the heat box to store the heated water.

The primary object of the invention if to provide a solar water heater which is mobile and which can be adjusted during use to align with the sun rays to obtain maximum heating efficiency.

Other objects and advantages will become apparent in the following specification when considered in the light of the attached drawings.

DESCRIPTION OF THE PREFERRED EMBODIMENT

Figure 1:
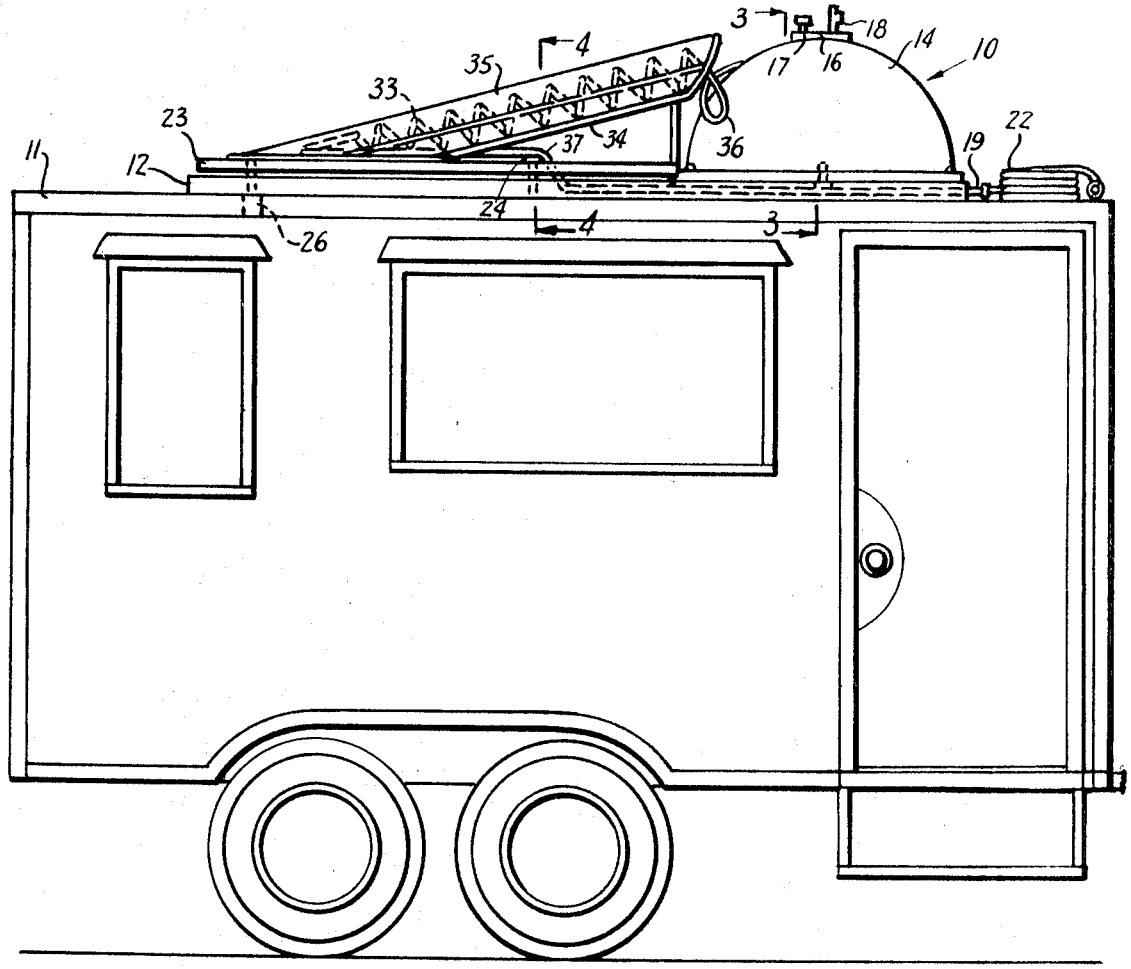
FIG. 1 is a side elevation of the invention.
Figure 3:
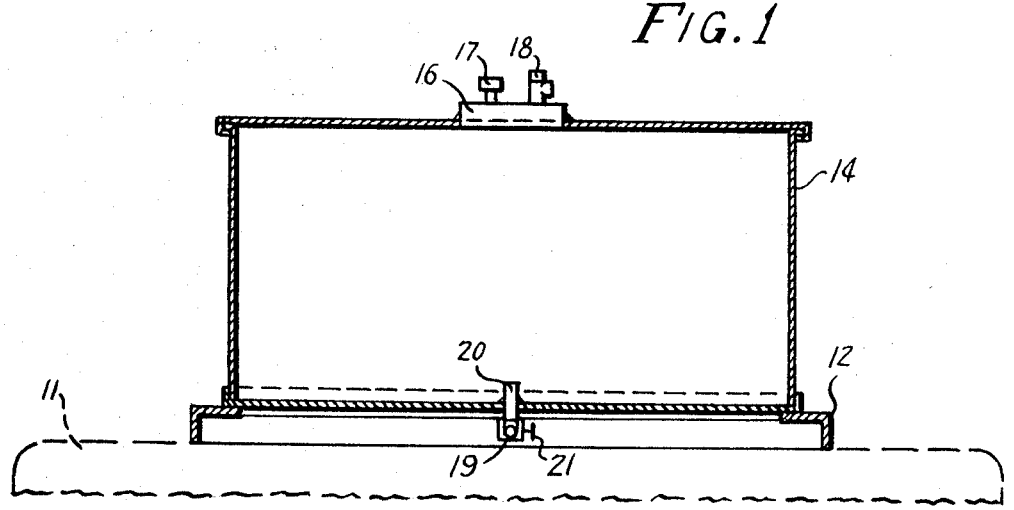
FIG. 3 is an enlarged transverse sectional view taken along the line 3-3 of FIG. 1, looking in the direction of the arrows.
Figure 2:
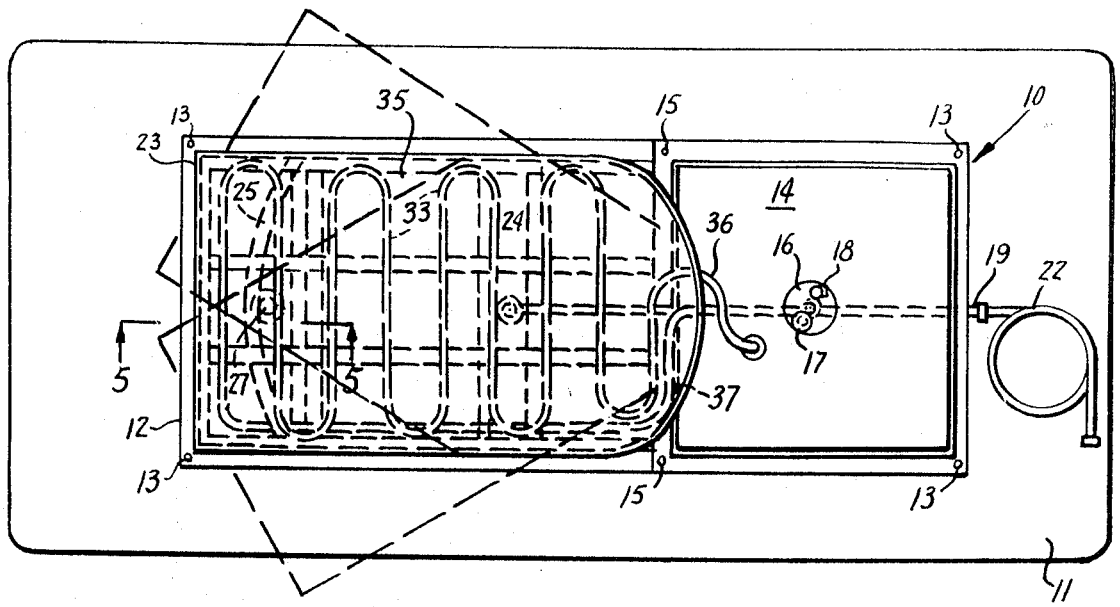
FIG. 2 is a top plan view of the invention.
Figure 4:
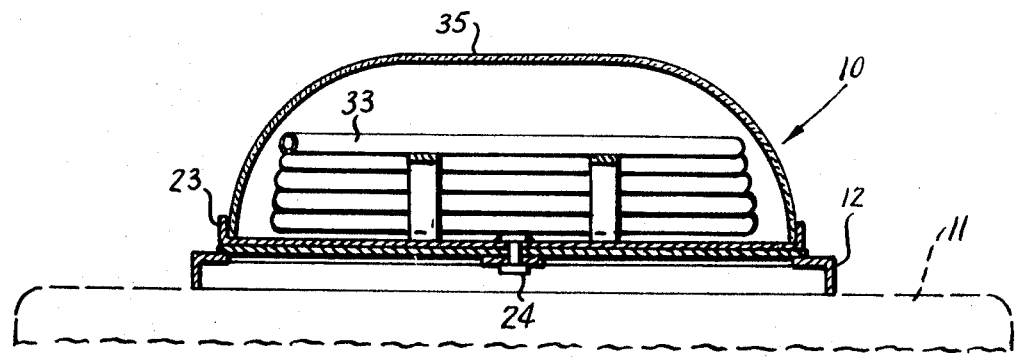
FIG. 4 is an enlarged transverse sectional view taken along the line 4-4 of FIG. 1, looking in the direction of the arrows.
Figure 5:
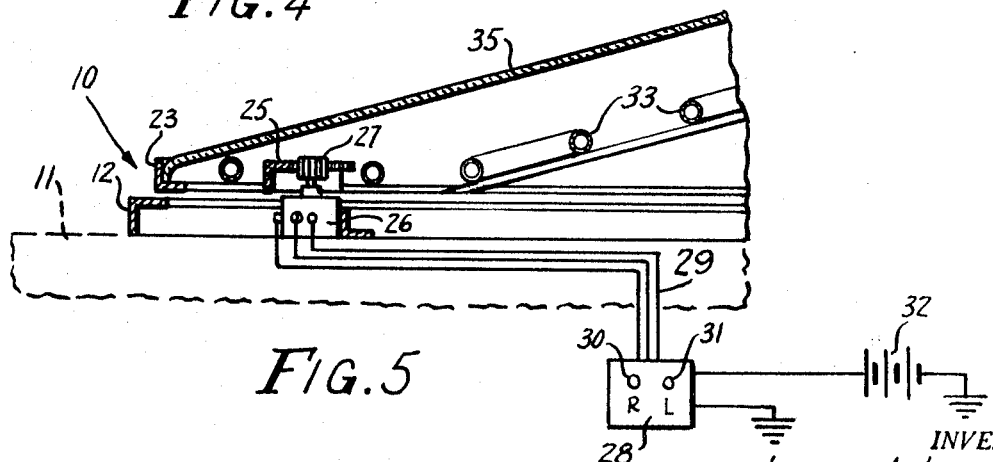
FIG. 5 is an enlarged fragmentary longitudinal section taken along the line 5-5 of FIG. 2, looking in the direction of the arrows.

Referring now to the drawings in detail wherein like reference characters indicate like parts throughout the several figures the reference numeral 10 indicates generally a mobile solar water heater constructed in accordance with the invention.

The water heater 10 is shown attached to the roof of a trailer 11 of conventional camper design. It should be understood that the solar water heater 10 may be attached to any vehicle desired to provide hot water for use therewith.

The solar water heater 10 includes an elongate generally rectangular substantially flat angle iron frame 12 detachably secured to the camper 11 by bolts 13 at the outer corners thereof.

A water tank 14 is secured to the forward end of the frame 12 by one pair of the bolts 13 and a pair of bolts 15 at the rear corners of the tank 14. The tank 14 is semicylindrical in form and has a fitting 16 mounted centrally of the top thereof. The fitting 16 has a safety steam valve 17 extending upwardly therefrom the permit the escape of steam should such be formed in the tank 14 due to excess solar energy. An air vent 18 is also provided on the fitting 16 to permit the flow of air into and out of the tank 14 as the level of water therein rises and falls.

A pipe 19 extends longitudinally in the frame 12 beneath the tank 14 and a nipple 20 extends upwardly therefrom into the tank 14. A hand controlled valve 21 is provided to permit water to flow from the tank 14 into the pipe 19 through the nipple 20.

A flexible hose 22 is connected to the outer end of the pipe 19 to be connected to any point where it is desired to use the heated water from the heater 10.

An angle iron frame 23 is secured to the angle iron frame 12 by a vertical pivot pin 24 extending upwardly therein. A circular rack 25 is mounted in the angle iron frame 23 at the end thereof opposite the pivot pin 24 and is arranged so that the pivot pin 24 is the center of the radius of curvature of the rack 25. A reversible electric motor 26 is mounted in the frame 12 and has a gear 27 mounted thereon engaging the circular rack 25 so as to pivot the frame 23 in both directions about the pivot pin 24.

A control box 28 is connected to the electric motor 26 by wires 29 so that with the pushbutton 30 the frame 23 can be moved to the right and with the pushbutton 31 reversed and moved to the left. The control box 28 is connected to the vehicle battery 32 to receive power therefrom.

A coil of black plastic pipe 33 is arranged in a heat box 34 mounted on the frame 23 to slope upwardly forwardly toward the tank 14. A clear plastic cover 35 extends over the coil 33 is permit the suns rays to enter the heat box 34 while preventing the flow of air therein. A flexible pipe 36 extends from the upper end of the coil 33 to the tank 14 and a flexible pipe 37 extends from the lower end of the coil 33 to the pipe 19.

In the use and operation of the invention the tank 14 is filled by connecting the hose 22 to a source of water under pressure or the fitting 16 is removed and the tank filled by means of a bucket. After the tank 14 is filled water flows through the coil 33 by convection circuits as the coils 33 are heated by the sun. The heated water is permitted to flow from the tank through the hose 22 for showers, dish washing or any other use.

Having thus described the preferred embodiment of the invention it should be understood that numerous structural modifications and adaptations may be resorted to without departing from the spirit of the invention.

What I claim is:

1. A mobile solar water heater for use with a mobile home comprising a frame detachable secured to the roof of the mobile home, a tank secured to said frame at one end thereof, a second frame mounted on said first frame for pivotal movement about a vertical axis, means for pivoting said second frame with respect to said first frame, a heat box secured to said second frame and extending upwardly at an angle with respect thereto, a coil of pipe mounted in said heat box for heating with solar energy, and means connecting said coil of pipe to said tank to permit convection circulation of water from said tank through said coil, said second frame secured to said first frame by means of a vertical pivot, and said means for pivoting said second frame on said first frame including a semicircular rack and a reversible electric motor coupled thereto.

2. A device as claimed in claim 1 wherein a transparent plastic cover extends over said heat box to permit the entry of suns rays while excluding a flow of air therein.

3. A device as claimed in claim 2 wherein said tank is provided with a high-pressure steam safety valve and an air vent valve to vent said tank.

4. A device as claimed in claim 3 wherein hand controlled remote switches are provided for said electric motor to permit the control of said second frame to position said heat box with respect to the position of the sun.

UNITED STATES PATENT OFFICE
CERTIFICATE OF CORRECTION

Patent No. 3,595,216          Dated July 27, 1971

Inventor(s) Joseph A. Lanciault

It is certified that error appears in the above-identified patent and that said Letters Patent are hereby corrected as shown below:

On the cover sheet, [72] "Tucson, Ariz. 01420" should read -- Fitchburg, Mass. 01420 -- .

Signed and sealed this 19th day of December 1972.

(SEAL)
Attest:

EDWARD M. FLETCHER, JR.          ROBERT GOTTSCHALK
Attesting Officer          Commissioner of Patents